April 7, 1970 R. W. WACEK 3,505,549
BRUSH HOLDER MOUNTING ASSEMBLY FOR AN ELECTRIC MOTOR
Filed Nov. 4, 1968 2 Sheets-Sheet 1

INVENTOR.
Rudolph W. Wacek
BY
ATTORNEY

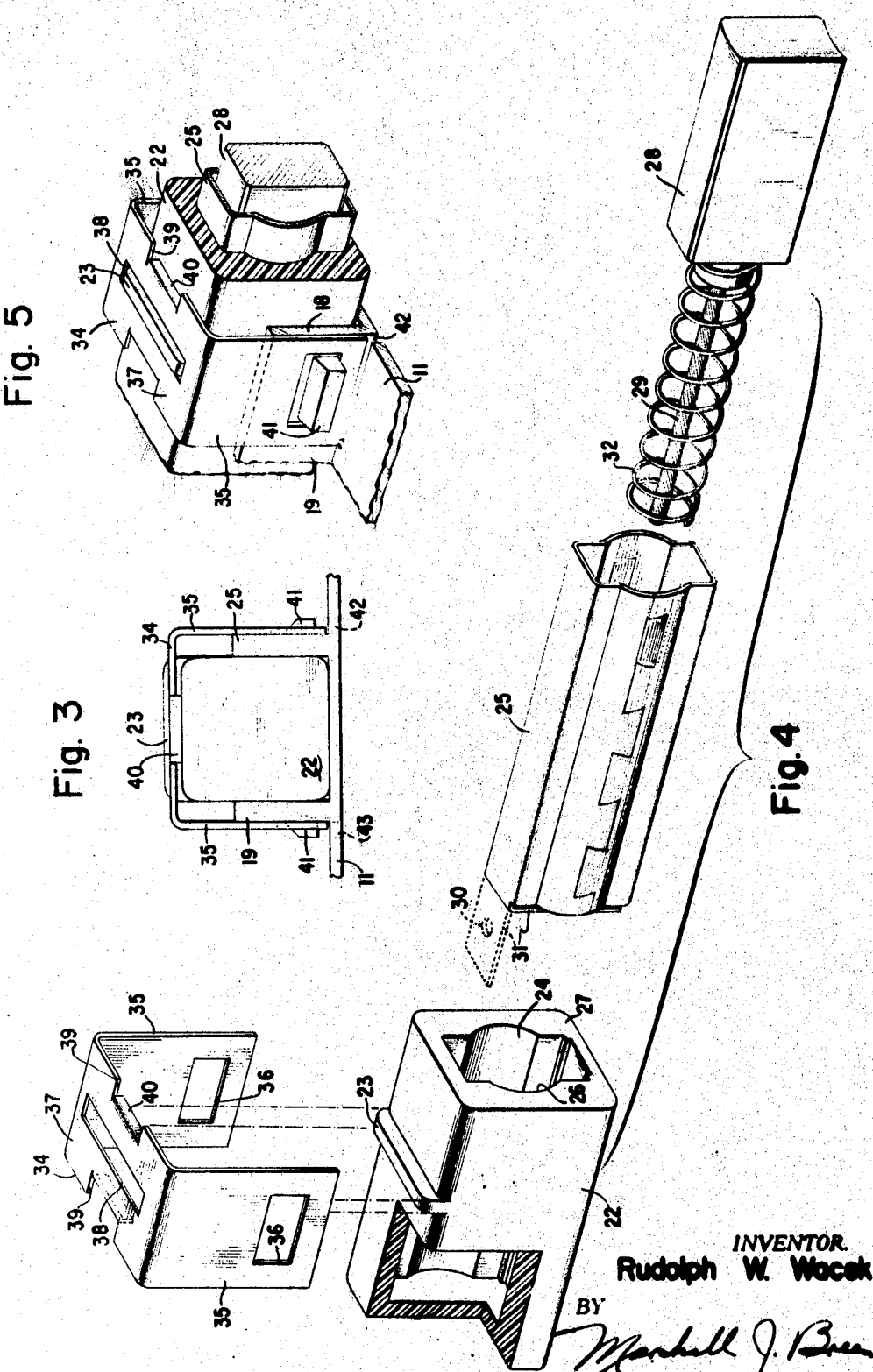

United States Patent Office 3,505,549
Patented Apr. 7, 1970

3,505,549
BRUSH HOLDER MOUNTING ASSEMBLY FOR AN ELECTRIC MOTOR
Rudolph W. Wacek, North Plainfield, N.J., assignor to The Singer Company, New York, N.Y., a corporation of New Jersey
Filed Nov. 4, 1968, Ser. No. 773,104
Int. Cl. H01r 39/40
U.S. Cl. 310—247           7 Claims

ABSTRACT OF THE DISCLOSURE

A mounting arrangement for a brush holder assembly for use in an electric motor wherein the assembly comprises an insulated brush holder provided on one of its walls with an integral upstanding fin or projection adapted to register with an opening formed in the leg-connecting or bridging portion of a substantially U-shaped spring clip to form a subassembly or brush holder unit for insertion into a radial channel provided on the upper bearing plate of the motor. Each leg of the spring clip is provided with an opening adapted to register with a projection integrally formed on the outer surface of the walls defining the radial channel for radially positioning the brush holder and releasably holding it on the upper bearing plate in its operable position relative to the commutator of the motor.

SUMMARY OF THE INVENTION

It is generally known in the prior art to provide an electric motor with means for mounting a brush holder assembly which in its broadest sense uses a resilient member to secure the brush holder assembly in place. However, such prior art arrangements and constructions have not satisfied the need in the industry for an economically feasible and dependable brush holder mounting construction. Prior art constructions have been found to be relatively expensive to manufacture because of the relative complexity of the various parts comprising the mounting arrangement and further, because of the extensive machining required of the motor frame to accommodate the brush holder assembly.

The present invention overcomes the above mentioned prior art deficiencies and more by providing a mounting arrangement for a brush holder assembly that is not only efficient for its intended use, but comprises a relatively simple construction which lends itself to inexpensive manufacturing facilities. This invention provides for use in an electric motor, a novel and improved brush holder assembly adapted to be mounted on the motor bearing plate at the commutator end of the motor, comprising an insulated brush tube holder for housing a brass tube, a carbon brush with its corresponding loading spring, etc., wherein the brush holder is held in its proper radial position in a channel formed in the motor bearing plate by means of a substantially U-shaped apertured spring clip which cooperates in a unique manner with a projecting integral portion located on one wall of the holder and with a pair of lateral projecting members provided on the outer surface of each of the channel-forming walls.

Accordingly, it is an object of this invention to provide for an electric motor, a novel and improved brush holder mounting arrangement and construction.

Another object of this invention is to provide an electric motor with a brush holder assembly comprising a novel and improved construction which facilitates insertion and removal thereof.

A further object of this invention is to provide a brush holder assembly of relatively simple, dependable and economically feasible construction.

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawings in which:

BRIEF DESCRIPTION OF THE DRAWINGS

FIG. 3 is an end elevational view of the brush holder assembly shown in FIGS. 1 and 2 mounted on the bearing plate or end bell of the motor;

FIG. 4 is an exploded perspective view of the brush holder assembly of the present invention, and FIG. 5 is a perspective view, partly in section, of the brush holder assembly mounted on the bearing plate of the motor.

DESCRIPTION OF THE PREFERRED EMBODIMENT

Figure 1:
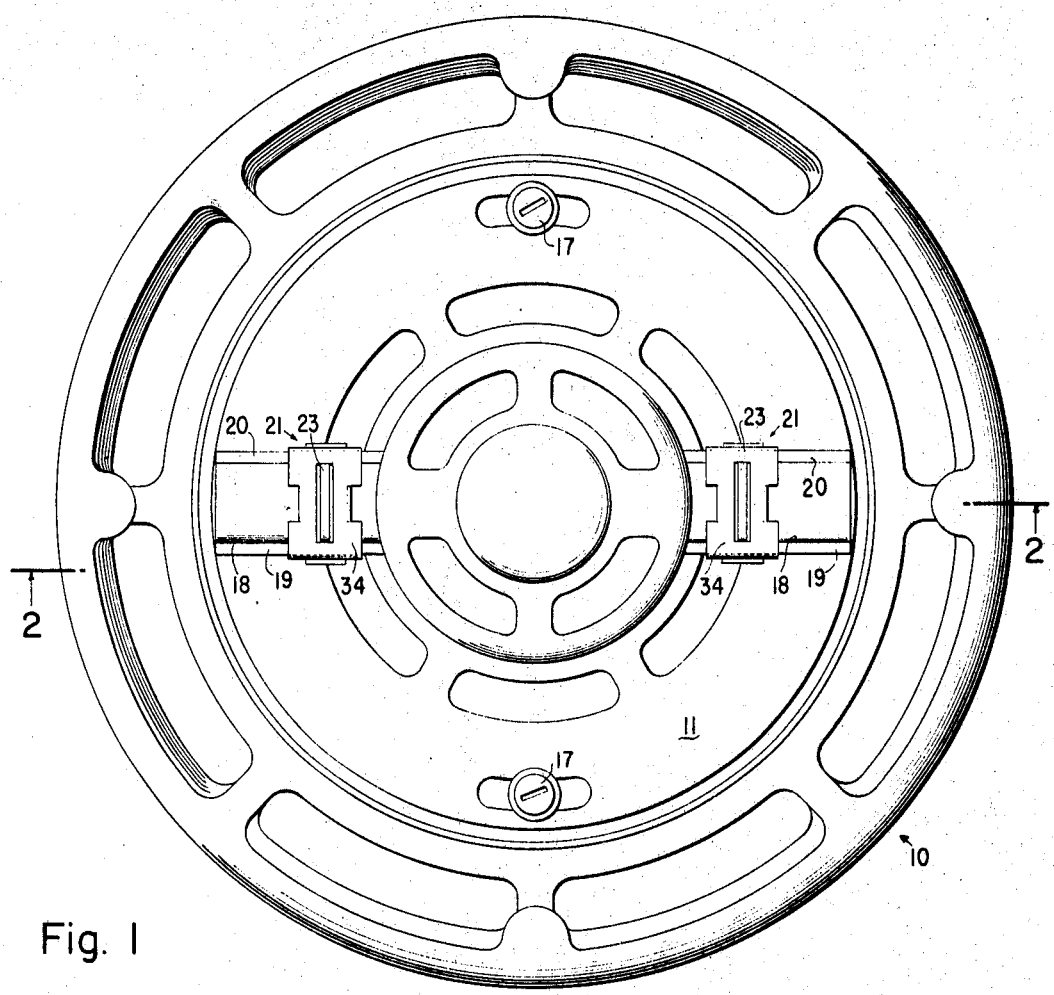
FIG. 1 is an elevational view taken from the commutator-end of an electric motor embodying a brush holder assembly constructed in accordance with the present invention.
Figure 2:
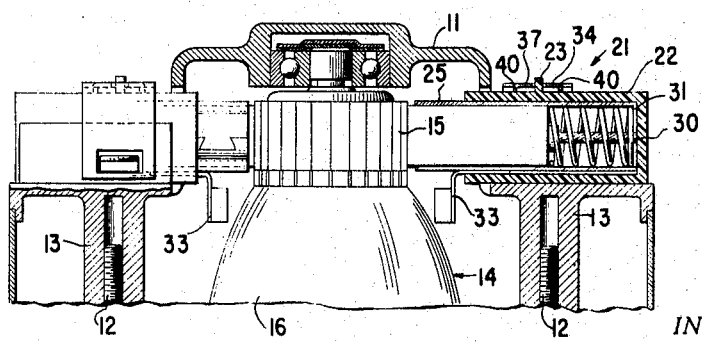
FIG. 2 is a partial sectional view taken substantially along the line 2—2 of FIG. 1.

Referring now more specifically to the drawings, wherein similar reference numerals denote identical parts throughout the several views, there is shown in FIGS. 1 and 2 a motor 10 (only a portion of which is shown) of conventional type having the usual stator wound with a field coil (not shown) secured to a metal brush-supporting bearing plate or end bell 11 of the motor by means of a plurality of axially disposed bolts 12—12 threaded into corresponding apertured boss members 13—13 formed integral with the bearing plate 11. In the end portion of the bearing plate 11 there is journaled for rotation in a conventional manner an armature assembly 14 including the usual shaft (not shown), a commutator 15 and armature lamination 16. As shown in FIG. 1 the bearing plate 11 conventionally is secured to the motor 10 by means of a pair of screws 17—17. A pair of radial channels 18—18, each being defined by upstanding walls 19 and 20, are provided in the bearing plate 11 of the motor for receiving and supporting in operable relationship relative to the commutator 15 a pair of similar brush holder units generally denoted 21—21. For a proper understanding of the invention only a single one of the brush holder assemblies will be described hereafter, since the units are identical in construction and arrangement.

The brush holder unit 21 comprises an electrically insulated brush tube holder 22 preferably made of a plastic material, having a substantially elongated rectangular-like shape, and being held in place in the radial channel 18 in a manner to be described hereinafter. The holder 22 is formed on its top wall, as best shown in FIG. 4, with an integral upstanding projection 23 disposed laterally of its length between opposing sides and is provided with a recess or guideway 24 extending substantially the entire length of the holder 22 adapted to receive a hollow metal brush receiving tube 25, constructed preferably of brass or a like material, through an opening 26 in an end wall 27 of the holder. The metal brush tube 25 receives a carbon brush 28 having a pigtail 29 electrically secured at one end to the brush and at its other end to an aperture 30 formed in a lug 31, integrally formed with the tube 25 which prior to being inserted into the holder 22 is bent downward from the dotted position (see FIG. 4) to its operable position shown in solid lines to substantially close one end of the tube 25, as best shown in FIG. 2, and a helical brush-loading or compression spring 32 surrounding the pigtail, all of which are well known in the art. A terminal lug 33 of conventional construction, as best illustrated in FIG. 2, is secured between the insulated holder 22 and the metal tube 25 for receiving an electrical lead (not shown) which is adapted to be connected to an appropriate source of power supply (not shown). The brush holder unit 21 is adapted to be properly seated in place in the radial channel 18 provided on the upper bearing plate 11 by means of a substantially U-shaped spring clip 34.

The metal spring clip 34 comprises a pair of legs 35—35, each being provided with rectangular or elongated opening 36 adjacent the free end of the leg. The legs 35—35 are integrally formed with a horizontal apertured top or bridging member 37 provided with an elongated opening or locating slot 38 extending between the spring legs 35—35 and a pair of cutout portions 39—39 substantially centrally located on each of the edges of the bridging member 37. These cutouts 39—39, which are disposed laterally on either side of the length of the locating slot 38, are formed by stamping out and bending downward by suitable means a pair of tabs 40—40 as best illustrated in FIG. 4, which as shown extend below the bridging member 37 in the direction of the legs 35—35.

To assemble the brush holder unit 21, the brush 28 with its pigtail 29 and the brush-loading spring 32 are inserted into the metal brush tube 25 whereupon the lug 33 is bent downward so that the end of the tube 25 furthest from the commutator 15 substantially is closed with the free end of the pigtail disposed in the aperture 30 of the lug 33, and in turn the tube 25 is inserted into the recess 24 in the plastic brush tube holder 22 through the opening 26. The spring clip 34 then is placed over the tube holder 21 so that the locating slot 38 registers with the fin 23 projecting upwardly from the top wall of the holder 22 to form an assembly for insertion into the radial channel 18 provided in the upper bearing plate 11. The projection 23 properly locates the spring clip 34 so that when the assembly is inserted into the channel 18 it properly will be positioned on the bearing plate relative to the commutator. As mentioned above, the spring clip 34 is formed with a slot 36 in each of its legs 35, which slot is placed in register with a beveled projection 41 provided on the outer surface of the channel walls 19 and 20 as illustrated in the drawings, FIGS. 3 and 5 in particular. The slots 36—36 are constructed and arranged so that the lower edge of the slot firmly engages the lower surface of the bevels, thus causing the free edge of the tabs 40—40 to bite into the top wall of the plastic holder 22, thereby holding it securely in place in the radial channel. The above construction restricts substantially any undesirable endwise movement and more particularly, any substantial radial outward movement on the part of the brush holder unit by means of the cooperation between the apertured spring clip 34 and the bevels 41—41 on the bearing plate. To facilitate mounting of the brush holder unit 21 in the radial channel 18 and to minimize the tolerances required for the spring clip 34, particularly as to the length of the spring legs 35—35, there is provided on the upper bearing plate 11 directly below the beveled projections 41—41 and adjacent the radial walls 19 and 20, a pair of open-ended slots 42 and 43 extending from the inner edge of plate 11 toward the outer edge thereof and terminating at a point spaced from the latter. As shown in FIG. 5, the slot length is substantially equal to the width of the spring leg 35 to facilitate mounting of the brush holder assembly in the radial channel.

Numerous alterations of the structure herein disclosed will suggest themselves to those skilled in the art. However, it is to be understood that the present disclosure relates to a preferred embodiment of the present invention which is for purpose of illustration only and is not to be construed as limiting the invention. All such modifications which do not depart from the spirit of the invention are intended to be included within the scope of the appended claims.

Having thus described the nature of the invention, what I claim herein is:

1. A brush holder assembly comprising in combination a metallic frame part of an electric motor and a brush holder unit mounted on said metallic frame part; said metallic frame part having means for supporting said brush holder unit and the supporting means having at least one laterally disposed projection integrally formed therewith, said brush holder unit including a brush holder having one wall thereof formed with a locating projection, clip means having a top portion provided with a locating aperture and a leg portion provided at its free end with an opening, said top portion being adapted to engage said one wall of said brush holder whereby said locating aperture is disposed in register with said locating projection, said laterally disposed projection being located on said supporting means so as to be adapted to register with said opening in said leg portion of said clip means, thereby to cause said clip means to hold said brush holder unit in proper position on said metallic frame part.

2. A brush holder assembly comprising in combination a metallic frame part of an electric motor and a brush holder unit mounted on said metallic frame part; said metallic frame part having means for supporting said brush holder unit and the supporting means having a pair of opposite extending projections integrally formed therewith, said brush holder unit including a brush holder having one wall thereof formed with a locating projection, clip means comprising a pair of apertured leg portions and a bridging portion connecting said apertured leg portions, said bridging portion having a locating aperture formed therein and being adapted for register with said locating projection when said bridging portion is placed in engagement with said one wall, said opposite extending projections being adapted to engage an adjacent apertured leg portion of said clip thereby to cause said clip to hold said brush holder unit in proper position on said metallic frame part.

3. A brush holder assembly in accordance with claim 2 wherein the supporting means comprises a pair of laterally spaced walls defining a seat for receiving said brush holder unit, each of said walls having a projection extending therefrom in an outward direction relative to said seat, the projection on each of said walls being constructed and arranged so that the aperture formed in each of said apertured leg portions will register with the adjacent projection thereby to cause said clip means to hold said brush holder unit in proper position in said seat.

4. A brush holder assembly in accordance with claim 2 wherein each of said projections integrally formed with the supporting means has a lower surface located relative to said apertured leg portions so that an edge of the aperture formed in the leg portion releasably engages a corresponding one of said lower surfaces of said projections therby to properly hold said brush holder unit in place on said supporting means.

5. A brush holder assembly comprising in combination a metallic frame part of an electric motor and a brush holder unit mounted on said metallic frame part; said metallic frame part having means for seating said brush holder unit and said seating means including a pair of spaced walls defining a channel adapted to receive said brush holder unit, the outer surface of each of said spaced walls having integrally formed therewith a projecting member, said brush holder unit including a brush holder having a top provided with a locating projection extending between the sides thereof, a retainer clip comprising a pair of legs formed with apertures therein and a top connecting said legs, said top being provided with locating means in the form of a slot extending between said legs, said top of said retainer clip being adapted to engage said top of said brush holder so that said slot will register with said locating projection, said projecting member on each of said walls being adapted to register with a corresponding one of said apertures formed in said legs when said brush holder unit is seated in said channel, thereby to properly locate said unit in said channel and to releasably secure said unit on said metallic frame.

6. A brush holder assembly in accordance with claim 5 wherein said top of said retainer clip is provided with at least one tab extending downward in the direction of said legs for locating said top of said retainer clip a spaced distance from said top of said brush holder, thereby to assist in properly positioning said brush holder unit in place when it is held in said channel.

7. A brush holder assembly in accordance with claim 5 wherein said metallic frame part is provided with a pair of radial slots each being located adjacent the outer surface of one of said walls directly below said projecting member, said slots each having a length substantially equal to the width of the corersponding leg thereby to facilitate assembly of said brush holder unit on said metallic frame part.

References Cited

UNITED STATES PATENTS

| | | | |
|---|---|---|---|
| 1,469,720 | 10/1923 | Dorsey | 310—239 |
| 2,798,176 | 7/1957 | Seyfried | 310—247 |
| 2,864,019 | 12/1958 | Gordon | 310—247 |
| 2,987,639 | 6/1961 | Bayless et al. | 310—247 |
| 3,176,177 | 3/1965 | Huston | 310—247 |
| 3,312,845 | 4/1967 | Satkunas | 310—247 |
| 3,329,844 | 7/1967 | Happe | 310—247 |
| 3,445,705 | 5/1969 | Fuller et al. | 310—247 |
| 3,436,576 | 4/1969 | Klebe | 310—247 |

MILTON O. HIRSHFIELD, Primary Examiner

L. L. SMITH, Assistant Examiner

U.S. Cl. X.R.

310—247